UNITED STATES PATENT OFFICE.

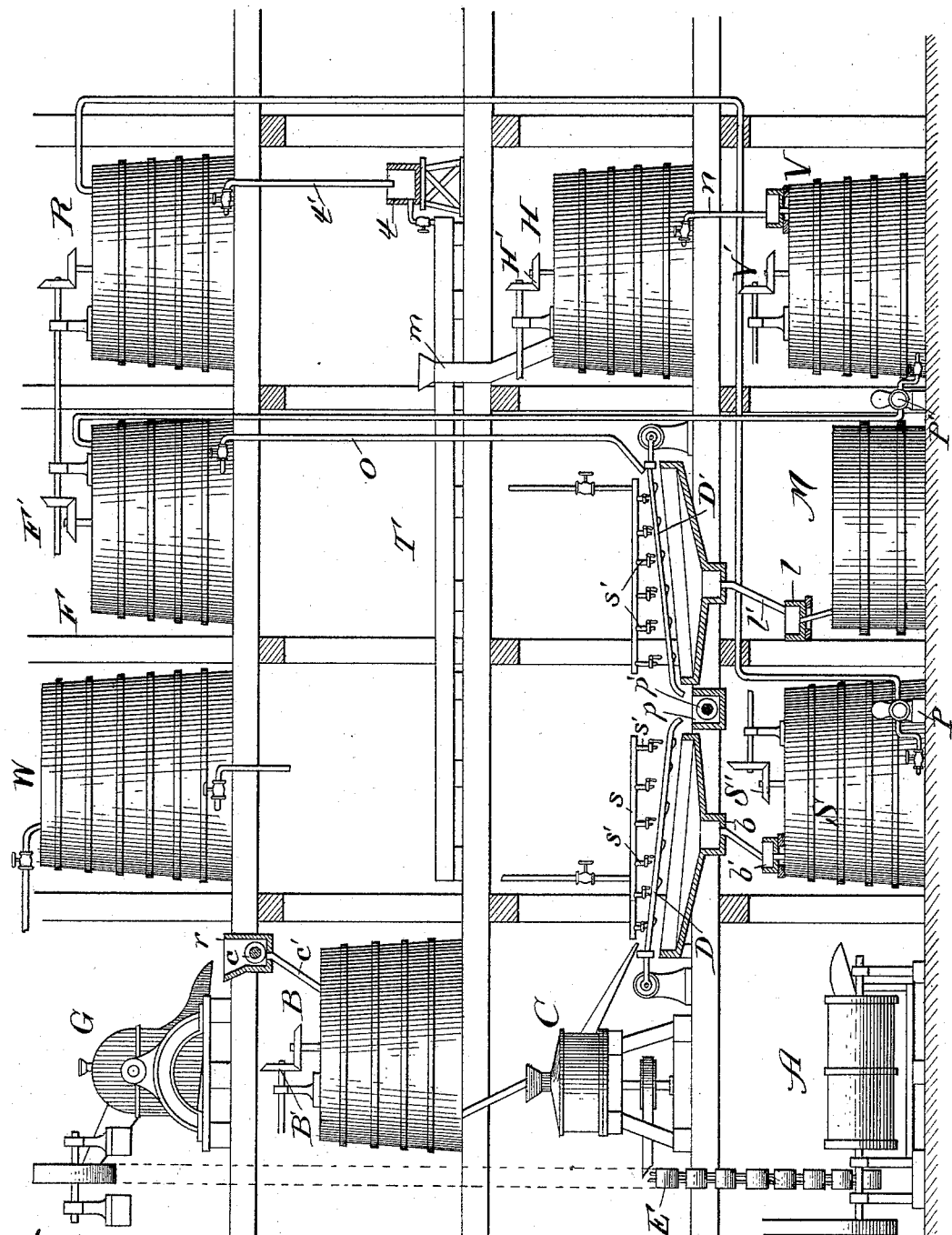

JULIUS DUBIEL, OF WAUKEGAN, ILLINOIS.

MANUFACTURE OF STARCH.

SPECIFICATION forming part of Letters Patent No. 493,689, dated March 21, 1893.

Application filed October 5, 1891. Serial No. 407,673. (No model.)

*To all whom it may concern:*

Be it known that I, JULIUS DUBIEL, a citizen of the United States, residing at Waukegan, in the county of Lake and State of Illinois, have invented a new and useful Improvement in the Manufacture of Starch, of which the following is a specification.

My invention relates to an improvement in the manufacture of starch from farinaceous plants of the species including cassava, and "coontie" or "coonta;" the last-named being popular names for the *Zamia integrefolia*, a plant of the natural order *Cycadaceæ*, a native of southern Florida.

My improved process, hereinafter described, serves to produce a superior quality of starch from any farinaceous plant of the species mentioned, and I do not, therefore, wish to be understood as limiting my process to coontie, though my improved product obtained from the latter has distinguishing characteristics, hereinafter mentioned; but as I have especially devised my process for the treatment of coontie to produce from it my improved article, the following description is confined to that plant, though it also applies to the treatment of cassava and other farinaceous plants of the same species for manufacturing starch from them. The plant coontie is found, by analysis and numerous experiments, to contain not only a very large percentage of starch, but a starch much finer in quality than any starch known; and the object of my improvement is to provide a process by which the starch can be obtained in a simple manner and economically as a superior article to any starch in the market, of finer quality than any known starch, whiter in color and devoid of taste or odor and perfectly neutral, and which shall be especially desirable for use in fine textiles and for culinary and laundry purposes.

The accompanying drawing shows, by a view in the nature of a diagram, apparatus suitable for the practice of my improved process, of which the following is a description in detail:

The roots are first thoroughly washed in a suitable washing-machine A, to free them from sand and other adhering impurities. From the machine A the roots are carried, through the medium of an elevator E, to a grating machine G, which operates to reduce them to a fine pulp and which empties into a receptacle $r$, whence the pulp is conveyed through a spout $c'$, by a rotary worm or conveyer, indicated at $c$, into a vat B. In the vat B the pulp is mixed with hot water and a suitable albumen - dissolving and fermentation preventing acid in solution, preferably sulphurous acid to the amount of about one-half of one per cent. in the solution, the proportion of which to the warm water should be about one-third. The sulphurous acid is thoroughly mixed with the contents of the vat, (thus, as will be noticed, with the raw material, before separation of the starch) provided with a stirrer $B'$ for the purpose, and the mass is left to soak for about twelve hours, more or less, at a temperature of about 110° Fahrenheit. Soaking the pulp with the acid, which forms an important step in my process, dissolves the albuminous matter and thus effects loosening of the starch-granules from the cellular tissues, and besides it tends to prevent fermentation. I next introduce into the mass, (still, as will be observed, into the raw material, from which the starch has not yet been separated) preferably in the same vat B, though it may be in another, a suitable bleaching chemical, preferably chloride of lime in solution in the proportion of about one hundred gallons of the lime solution containing fifteen pounds of the chloride of lime to about one hundred pounds of the mass, and mix it throughly, allowing it to steep for about twelve hours longer. The addition of the bleaching chemical forms another important step in my process, its effect being to destroy the color contained in the cellular tissue of the plant, which is a dull red, and which, if not removed, would give the finished product a reddish hue. The degree of concentration of the sulphurous acid and chloride of lime solutions should be varied in accordance with the quality of the plant, more of the lime being used where the plant is of a dark color than where it is lighter, and more of the acid where the plant contains a material amount of albuminoids. After the steeping operation, the pulp is let into a mill C, preferably a disk-mill of the type known as the "Bogardus" mill, and therein very finely ground. The finely ground pulp is next strained to separate the starch from the then decolorized cellular tissue, being to that end passed over a suitable sieve, represented at D, of silk, bolting cloth or fine wire cloth, which is maintained in constant motion and sprayed with water from the taps $s'$ of the header $s$, the supply of water being taken from a reservoir W. The starch passes through the bolting-cloth, with the water, as a milky fluid, leaving behind the coarser cellular tissue and woody fiber, which are tailed off into a suitable trough $p$ containing a conveyer indicated at $p'$, the residue affording a good feed for cattle, and to that end being preferably compressed to remove the water and, if desired, then dried. The water holding the starch in suspension runs, from the sieve D, into a trough $b$, which empties into a trough $b'$ surmounting and opening into a vat S, provided, like the vat B, with stirring mechanism, indicated at $S'$. In the last-named vat the starch settles; and the water is drawn off. The starch thus remaining in the vat S is then mixed with fresh water and agitated for about three to five hours to disintegrate the finer particles of fiber and starch. The gravity of the mixture is next reduced by adding to it more water to about 5° Baumé, and the contents of the vat S are then forced by the pump P into a receiving-tank R, and passed thence through a pipe $t'$ and by way of a trough $t$ to inclined tables, indicated at T, upon which the starch is deposited. These tables are in the form of long wooden runs, or troughs, slightly inclined; and as the stream flows slowly upon their upper ends, the starch is deposited, while the water, bearing lighter particles of fiber, gluten and other impurities, flows off from the lower end. The starch thus deposited upon the tables is not entirely free from impurities, but it nevertheless affords an excellent article for finishing textiles and for various other purposes, and to that end may be collected in molds, or on trays, and dried in a suitable kiln. For manufacturing a finer quality of the starch, it is taken from the tables T, mixed with fresh water, washed, sifted through another set of vibrating sieves covered with a very fine cloth, and then deposited in suitable tanks. This refined and thoroughly purified starch is placed in molds and dried in a suitable kiln.

H represents a vat, provided with suitable stirring mechanism, indicated at $H'$, and wherein the starch, introduced through a spout $m$ from the tables T, is mixed with water to about 20° Baumé. From the vat H the mixture is transferred through a pipe $n$ to a vat V, like the vat S, wherein it is reduced with water to about 10° Baumé and agitated by means of the stirring-mechanism, indicated at $V'$, for several hours, say about three to five hours. The liquid is thence forced, by a pump $P'$, into a receiving tank or vat F, therein agitated by the indicated stirring-means $F'$, and passed through the pipe $o$ to inclined vibrating sieves $D'$, in all respects like the sieves D, and, like the latter, supplied with water from taps $s'$. From the sieves $D'$, the starch liquid which passes through the latter runs through a pipe $l'$ and trough $l$ into the vat M, wherein the starch settles, the refuse tailing off into the trough $p$.

The illustrated plan of arrangement of the apparatus I employ for practicing my process is merely suggestive, and may, of course, be variously departed from, as to accord with space in and the general character of the building in which the work is done.

The starch produced by my process from the aforesaid species of plant is of superior quality, being much finer in quality than any starch known to me; and the product derived from coontie is not only of a pure white color, but it is further distinguished from other starch by its tastelessness, lack of odor, and by the exceptionally high adhesive quality it has in paste made with it.

What I claim as new, and desire to secure by Letters Patent, is—

1. In the manufacture of starch from coontie and farinaceous plants of like species, the process of separating the albumen and decolorizing the material, which consists in reducing the material to a pulp and treating the pulp prior to separating the starch from the cellular tissue with sulphurous acid and chloride of lime, substantially as described.

2. The process of manufacturing starch from coontie and farinaceous plants of like species, which consists in reducing the material to a pulp, steeping the pulp and treating it prior to separating the starch from the cellular tissue with sulphurous acid and chloride of lime separating the starch from cellular tissue in the pulp, precipitating the starch from the liquid holding it in suspension, mixing the precipitated starch with fresh water and agitating it, and separating the starch from the liquid, substantially as described.

3. The process of manufacturing starch from coontie and farinaceous plants of like species, which consists in reducing the material to a pulp, steeping the pulp and treating it prior to separating the starch from the cellular tissue; with sulphurous acid and chloride of lime separating the starch from cellular tissue in the pulp, precipitating the starch from the liquid holding it in suspension, mixing the precipitated starch with fresh water and agitating it, separating the starch from the liquid and impurities therein by settling, again mixing and agitating the resultant starch with fresh water, further reducing the mixture with water and stirring it and straining it to separate impurities therefrom, and separating the starch from the resultant liquid by precipitation, substantially as described.

4. The process of manufacturing starch from coontie and farinaceous tubers of like species, which consists in first washing the roots, reducing them to a fine pulp by grating, steeping the pulp with a solution of sulphurous acid and agitating the mass, then adding to the mass a solution of chloride of lime, finely grinding the pulp and straining it to separate the starch from the coarser cellular tissue and wood-fiber, disintegrating the finer particles of fiber and starch by mixing the strained liquid with fresh water, and stirring it, reducing the gravity of the mixture, depositing the starch from the mixture, mixing the deposited starch and agitating it with fresh water, again reducing the mixture with water and stirring it, straining the mixture to separate the starch from the finer particles of fiber, and separating the starch from the liquid by precipitation, substantially as described.

JULIUS DUBIEL.

In presence of—
M. J. FROST,
J. N. HANSON.